United States Patent [19]

Talluri et al.

[11] Patent Number: 5,630,087
[45] Date of Patent: May 13, 1997

[54] APPARATUS AND METHOD FOR EFFICIENT SHARING OF VIRTUAL MEMORY TRANSLATIONS

[75] Inventors: Madhusudhan Talluri, Madison, Wis.; Yousef A. Khalidi, Sunnyvale, Calif.

[73] Assignee: Sun Microsystems, Inc., Mountain View, Calif.

[21] Appl. No.: 333,487

[22] Filed: Nov. 2, 1994

[51] Int. Cl.$^6$ .............................. G06F 9/26; G06F 9/34; G06F 12/00; G06F 12/02
[52] U.S. Cl. .................. 395/412; 395/413; 395/416; 395/417; 395/415; 395/420
[58] Field of Search ............................ 395/417, 412, 395/416, 403, 413, 420, 415

[56] References Cited

U.S. PATENT DOCUMENTS

| | | | |
|---|---|---|---|
| 4,654,790 | 3/1987 | Woffinden | 395/417 |
| 4,797,814 | 1/1989 | Brenza | 364/200 |
| 5,386,527 | 1/1995 | Bosshart | 395/403 |
| 5,437,017 | 7/1995 | Moore et al. | 395/400 |
| 5,440,708 | 8/1995 | Takagi | 395/418 |
| 5,440,710 | 8/1995 | Richter et al. | 395/417 |

OTHER PUBLICATIONS

Milenkovic, "Microprocessor Memory Management Units," IEEE Micro, vol. 10, No. 2, Apr. 1990, pp. 70–85.

Huck, et al., "Architectural Support for Translation Table Management in Large, Address Space Machines", 20th Annual International Synposium on Computer Architecture, May 1993, pp. 39–50.

*Primary Examiner*—David K. Moore
*Assistant Examiner*—Than V. Nguyen
*Attorney, Agent, or Firm*—Flehr Hohbach Test Albritton & Herbert LLP

[57] ABSTRACT

A method and apparatus to share virtual memory translations in a computer is described. The apparatus includes an operating system that runs in conjunction with a central processing unit. The operating system is programmed to include an address identification routine to identify distinct virtual memory translation entries, associated with a plurality of distinct processes running on the computer, that map to one or more common physical memory page addresses. The operating system also includes a mask assignment routine to assign a first mask value to the distinct virtual memory translation entries, and a write routine to write, to a translation-lookaside buffer or a page table, the distinct virtual memory translation entries as a single address associated with the first mask value. A comparison mechanism is used to compare a second mask value of a translation-request virtual memory translation value to the first mask value to determine whether the second mask value corresponds to said first mask value. If the two mask values correspond, then the single address associated with the first mask value is used as a virtual memory translation address.

19 Claims, 9 Drawing Sheets

APPARATUS AND METHOD FOR EFFICIENT SHARING OF VIRTUAL MEMORY TRANSLATIONS

BRIEF DESCRIPTION OF THE INVENTION

This invention relates generally to computer system translation operations between virtual memory addresses (or similar virtual memory translation entries) and physical memory addresses. More particularly, this invention describes a computer system that uses a single virtual memory translation entry for different virtual addresses from different processes that map to a single physical address.

BACKGROUND OF THE INVENTION

Figure 1:
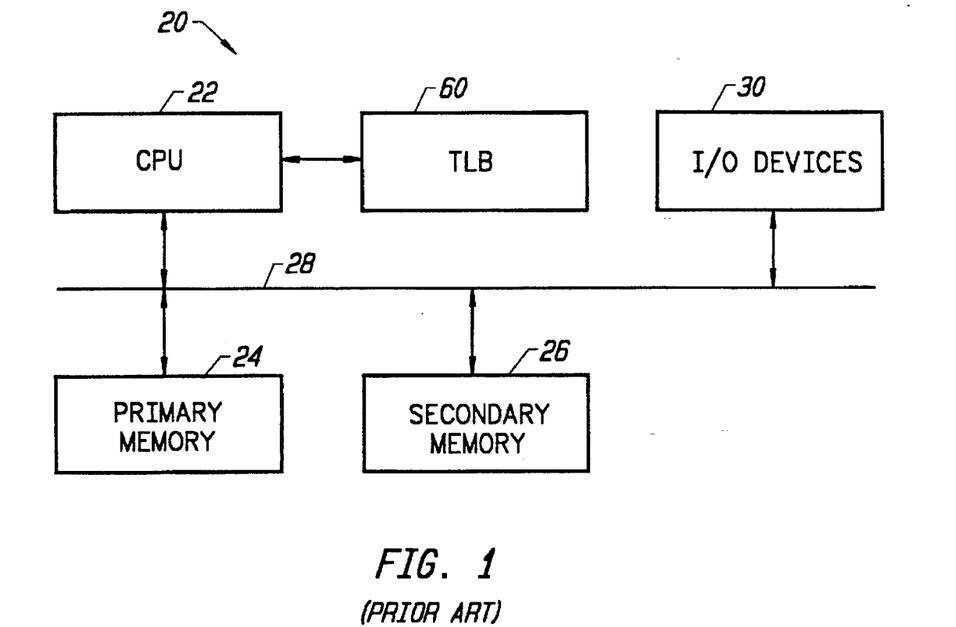
FIG. 1 is a prior art computer system that executes a virtual memory scheme.

FIG. 1 illustrates a general purpose computer 20 that includes a central processing unit 22 that communicates with primary memory (generally Random Access Memory) 24 and secondary memory (generally disk storage) 26 over a system bus 28. Input/Output devices 30, such as keyboards, monitors, printers, or data acquisition cards, are also connected to the system bus 28. The CPU 22 executes one or more computer programs stored in primary memory 24. Most instructions and data in a computer program have a corresponding virtual address. Each virtual address is then translated to a physical address located in primary memory 24. If the required information is not in primary memory 24, then a page fault occurs, and the CPU 24 loads the required information from secondary memory 26 into primary memory 24.

The use of virtual addresses in a computer is a technique commonly referred to as "virtual memory". Practically all computers rely upon virtual memory. Virtual memory allows a computer to execute a program that includes a range of addresses that may exceed the actual memory storage capacity of the computer. Thus, programmers are not restricted by memory-size considerations, and the programs are portable between hardware environments with different memory capacities.

As indicated above, there is a need to translate between a virtual address and a physical address. The virtual address is the address locally used by a program. The physical address specifies the actual physical location of the information in the primary memory 24.

Figure 2:
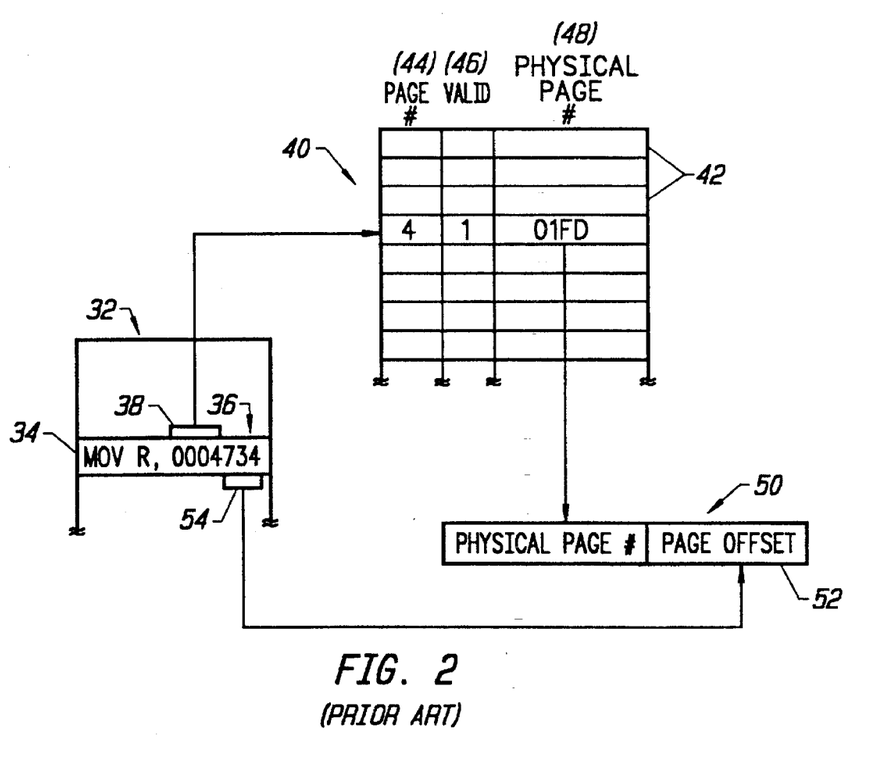
FIG. 2 illustrates the operation of a page table in the apparatus of FIG. 1.

FIG. 2 illustrates the translation operation between a virtual address and a physical address. A computer program 32, stored in primary memory 24, includes a set of instructions, one such instruction is illustrated as element 34 in FIG. 2. The instruction 34 is a command to move ("MOV") to register "R" the contents of memory corresponding to the virtual address "0004734" (36). The numbers are in base 16—Hexadecimal. The virtual address 36 includes a virtual page number "0004" (38), also called a virtual memory page address, that is mapped to a page table 40. The page table 40 includes a set of page table translation entries 42. Each page table translation entry 42 includes a virtual page number 44, a valid bit 46, and a physical page number 48 (also called a physical memory page address). If the valid bit is set (digital one), this indicates that a physical page number 48 exists in primary memory 24 corresponding to the virtual page number 38. If the valid bit is not set, then a page fault occurs and the physical page number 48 must be found in secondary memory 26 by the CPU 22. The physical page number 48 specifies a page of memory in primary memory 24. The terms primary memory 24 and physical memory will be used interchangeably herein.

FIG. 2 illustrates the use of a virtual page number as a virtual address. It will be appreciated by those skilled in the art that the virtual page number can be substituted with an entry that allows the derivation of a virtual address. References in this document to virtual page numbers or virtual memory translation entries are intended to describe any virtual page number system or related scheme used to derive a virtual address.

A complete physical address 50 includes the physical page number 48 and a page offset 52. The page offset 52 specifies the row in the page of memory that the address of interest can be found. The page offset 52 is directly obtained (without translation) from the virtual offset portion 54 of the virtual address 36.

In sum, to obtain a physical address 50 from a virtual address 36, the virtual page number 38 of the virtual address (in this example "0004") is mapped to a page table translation entry 42 found in a page table 40. If the page table translation entry 42 has its valid bit set to one, then there is a corresponding physical page number for the virtual page number. The physical page number (in this example "01FD" Hex) forms a portion of the physical address 50. The other portion of the physical address 50 is a page offset value 52 (in this example "734") that is obtained from the virtual offset portion 54 of the virtual address 36.

Figure 3:
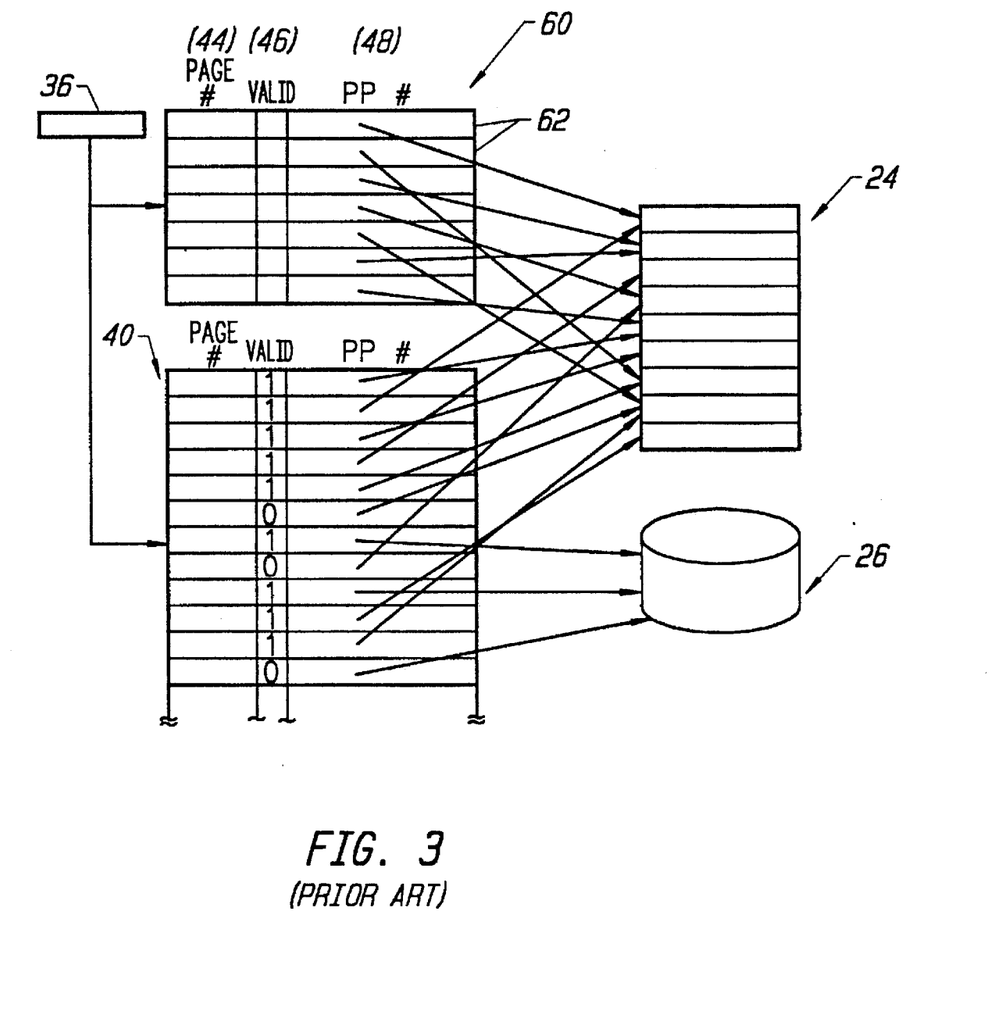
FIG. 3 illustrates the relationship between a translation-lookaside buffer and a page table relative to primary memory and secondary memory.

FIG. 3 illustrates the correspondence between specified physical pages in a page table 40 and different physical locations in physical memory 24. In the page table 40 of FIG. 3, each entry with its valid bit set to a digital one has a pointer to a location in physical memory 24. For those page table entries that have a valid bit set to a digital zero, a page fault occurs, and a page of memory must be fetched from secondary memory 26 into physical memory 24 and a corresponding modification is then made to the page table 40.

To improve the performance of page tables 40, modern computers include a special cache that keeps track of recently used translations. The recent translations are stored because once a translation for a virtual page number is used, it will probably be used again in the near future. This special address translation cache is referred to as a translation-lookaside buffer, or TLB 60. FIG. 1 and 3 illustrate a TLB 60. In FIG. 3 it can be appreciated that a TLB 60 includes a set of TLB translation entries 62. Typically, a TLB translation entry 62 includes a virtual page number 44, a valid bit 46, and a physical page number 48.

A CPU 22 running a computer program initially compares each virtual page number from the computer program to the entries in the TLB 60. If a match is found (called a hit), the physical page number from the TLB 60 is used to form the physical address 50, in the manner previously described.

A TLB 60 is typically implemented in hardware and therefore has fewer entries than a page table 40. In view of the smaller size of a TLB 60, TLB misses occur frequently. After a TLB miss, the page table 40 is queried to determine the physical address. If the page table 40 has the desired information, that information can be loaded from the page table 40 into the TLB 60.

Since it is much faster to obtain a physical address from a TLB 60 than from a page table 40, there are ongoing efforts to improve the amount of information placed in a TLB 60. One obvious solution is to provide a physically larger TLB 60. Of course, this approach is expensive. Other techniques attempt to maximize the size of memory mapped by a TLB 60 without increasing the number of TLB entries. Such schemes include the use of superpages and partial-subblocking. Many commercial architectures support superpages in one form or another, including the SPARC™ chip (Sun Microsystems, Mountain View, Calif.), the Alpha™ chip (Digital Equipment Corporation, Maynard, Mass.), and the PowerPC™ chip (Motorola Corporation, Schaumberg, Ill.). These schemes share the basic idea of reducing the number of TLB entries 62 needed to map a given region of memory.

Superpages improve TLB performance by using one TLB entry instead of several entries for consecutive base pages that belong to the same process. This approach is somewhat limited because it only applies to a single process that is running on the computer. Large commercial and multi-user systems have many processes that reference the same memory object. For example, heavily used libraries, program text segments, and shared buffer regions may each have a few hundred mappings to a single physical address. This phenomenon is illustrated in FIG. 4.

Figure 4:
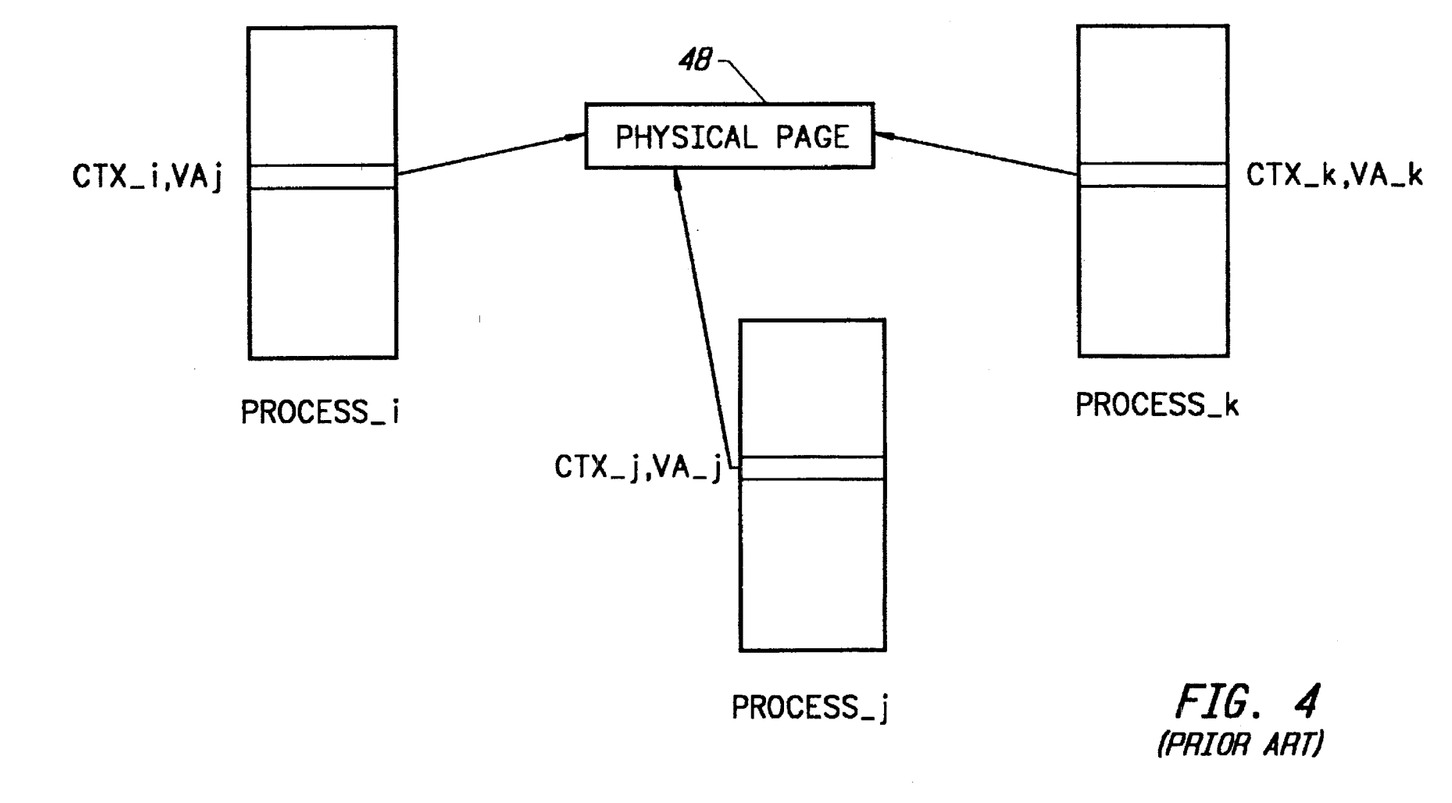
FIG. 4 illustrates a set of distinct processes with distinct virtual addresses mapping to the same physical page address.

FIG. 4 illustrates Process_i, Process_j, and Process_k running on a computer system. Each memory address in Process_i is identified with a context number (program number), shown as CTX_i in FIG. 4, and a virtual address, shown as VA_i in the figure. The address (CTX_i, VA_i) points to a particular physical page number 48 (physical memory page address). Similarly, other memory addresses running in other processes, point to the same physical page number. Specifically, CTX_j, VA_j of Process_j and CTX_k, VA_k of Process-k point to the same physical page number 48.

Figure 5:
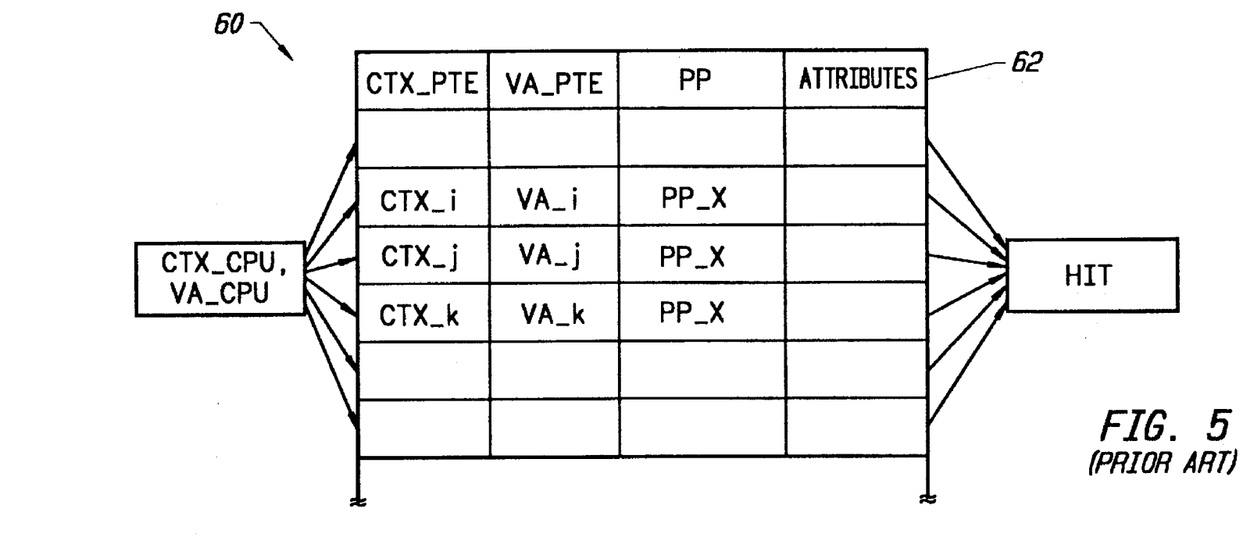
FIG. 5 illustrates a translation-lookaside buffer.

FIG. 5 illustrates a TLB 60 corresponding to the operations shown in FIG. 4. Each TLB translation entry 62 (each row of the TLB 60) includes a context identification (CTX), a virtual address (VA), a physical page (PP), and attributes, such as a valid bit and protection bits. Note that the physical page (physical memory page address) PP_X appears three times in the TLB 34. That is, (CTX_i, VA_i), (CTX_j, VA_j), and (CTX_k, VA_k) each map to the same physical page PP_X. It would be highly desirable to provide a TLB that used a single TLB entry for every virtual address that maps to the same physical page. Such a TLB would greatly expand the information content possessed by a single TLB, since a single entry in the TLB could be used to map multiple virtual addresses.

Typically, each address from the CPU 22 includes a context number (CTX_CPU) (from a context register in the CPU) and a virtual address (VA_CPU). An address received from the CPU to be translated by the TLB or a page table may be referred to as a translation-request virtual memory translation value.

As shown in FIG. 5, the processing of data in a fully associative TLB 60 is done in parallel. That is, each address from the CPU 22 is simultaneously applied to each value in the TLB 60. A TLB hit is declared if the following is true for some page table entry in the TLB:

$$(CTX\_CPU=CTX\_PTE) AND (VA\_CPU=VA\_PTE) \quad \text{(Equation 1)}$$

This statement indicates that there is a TLB hit when the context identification from the CPU (CTX_CPU) is equivalent to the context identification provided in the TLB (CTX_PTE; for example, CTX_i in FIG. 5) and the virtual address provided to the TLB from the CPU (VA_CPU) is equivalent to the virtual address in the TLB (VA_PTE; for example VA_i in FIG. 5). FIG. 5 illustrates that CTX_CPU is applied to each TLB entry and that a "hit" is identified when a match is found. Known hardware is used to accomplish this operation.

In a set-associative TLB, each address from the CPU 22 is simultaneously applied to each value in the TLB set identified by CTX_CPU and VA_CPU.

The problem of multiple virtual address entries for the same physical address is not limited to TLBs 60, the same problem is associated with software searches of page tables 40 in primary memory 24. When there are many virtual address translations to the same physical address, the page tables 40 may become unnecessarily large. Consequently, searching these large tables for the desired translation is a time consuming operation. Thus, it would be highly desirable to provide main memory page tables 40 that use a single memory translation entry for every virtual memory page address that maps to the same physical memory page address.

SUMMARY OF THE INVENTION

The invention is an apparatus to share virtual memory translations in a computer. The apparatus includes an operating system that runs in conjunction with a central processing unit. The operating system is programmed to include an address identification routine to identify distinct virtual memory translations, associated with a plurality of distinct processes running on the computer, that map to one or more common physical memory page addresses. The operating system also includes a mask assignment routine to assign a first mask value to the distinct virtual memory translations, and a write routine to write, to a translation-lookaside buffer or a page table, the distinct virtual memory translations as a single address associated with the first mask value. A comparison mechanism is used to compare a second mask value of a translation-request virtual memory translation value to the first mask value to determine whether the second mask value corresponds to the first mask value. If the two mask values correspond, then the single address associated with the first mask value is used as a virtual memory translation address.

The invention includes a method to share virtual memory translations. The method of the invention includes the step of identifying a plurality of distinct virtual memory translations, associated with a plurality of distinct processes running on a computer, that map to a common physical memory page address. The method further includes the steps of assigning a first mask value to the plurality of distinct virtual memory translations and storing the plurality of distinct virtual memory translations as a single address associated with the first mask value. Finally, the method includes the step of comparing a second mask value of a translation-request virtual memory translation value to the first mask value to determine whether the second mask value corresponds to the first mask value and thereby determine whether the translation-request virtual memory translation value maps to the common physical memory page address.

When the invention is implemented using a translation-lookaside buffer, the sharing of virtual address translations permits the fixed number of translation-lookaside buffer entries to encompass a substantially larger scope of information. When the invention is implemented using page tables, the number of page table entries and the memory required to store them is substantially decreased. Accordingly, the size of the page tables and the time required to search the page table entries is substantially diminished.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

The present invention is directed toward a method and apparatus to redefine memory translation entries that are used in TLBs 60 and memory page tables 40. In accordance with the invention, all memory translation entries mapped to the same physical memory page address are assigned to an equivalency class. The equivalency class has an associated mask scheme that allows translations from different virtual memory translation entries to the same physical memory page address. Consequently, different virtual memory translation entries from different processes (for example, Process_i, Process_j, and Process_k of FIG. 4) can all be identified through a single memory translation entry in a TLB or memory page table.

The technique of the invention improves TLB performance by allowing entries for pages from different processes to share a single TLB entry. Thus, each TLB entry signifies more information. When applied to software tables, the sharing of translation entries results in a reduction of the memory size needed for page tables. In addition, there is a reduction in the required page table search time.

Figure 6:
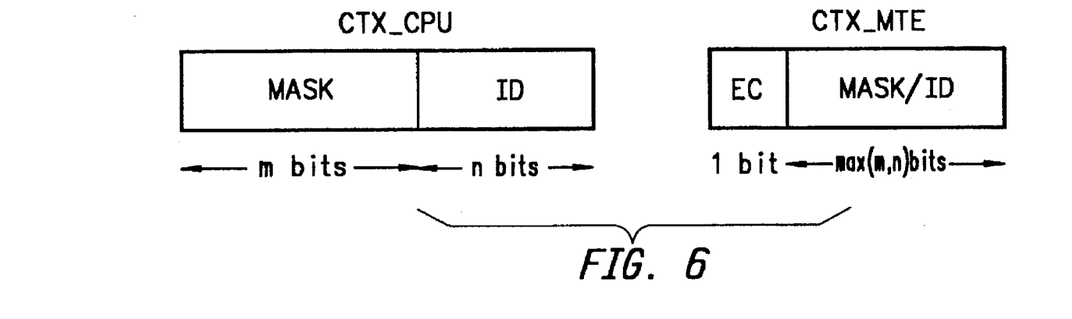
FIG. 6 illustrates memory translation information used in accordance with the invention.

The invention relies upon the redefinition of context data from the CPU and memory translation entries in a TLB or memory page table. That is, with the present invention, the CPU processes context data in the form of a multiple bit word that includes m bits defining a mask and n bits defining an identification number (the CTX_CPU value used in the prior art). A memory translation entry in accordance with the invention has a multiple bit word that includes an equivalency class bit and a mask portion of m bits or an identification portion of n bits. This system is illustrated in FIG. 6. The process context information passed from the CPU (CTX_CPU) is shown on the left-hand side of the figure, while the memory translation entry information (CTX_MTE) is shown on the right-hand side of the figure.

Figure 7:
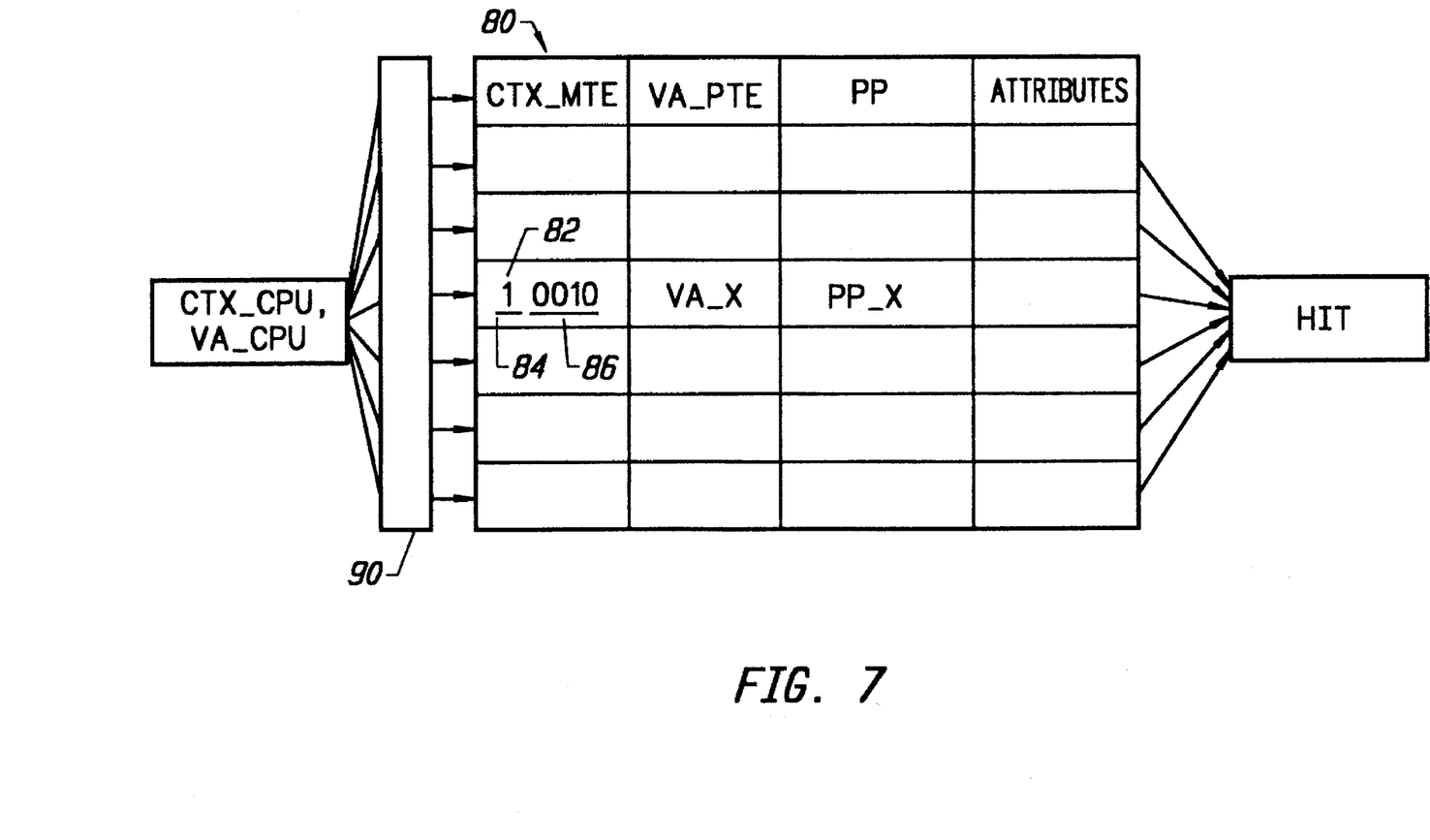
FIG. 7 illustrates a translation-lookaside buffer incorporating the memory translation information of the invention.

Each memory translation entry includes information relating to an equivalency class. An equivalency class includes all virtual memory objects (memory page table entries or TLB entries) that share a common physical memory page address. For example, in FIG. 5, it can be seen that three entries in the TLB 60 have the same physical memory page address (PP_X), mapping to the same physical memory location, as shown in FIG. 4. Because an equivalency class exists in this case, the equivalency bit (EC in FIG. 6) would be set to one. An m bit long mask would then be used to characterize the particular equivalency class. Thus, for example, the three entries of the TLB 60 of FIG. 5 would be collapsed into a single TLB entry with an equivalency bit set to one and an m bit word defining the particular equivalency class. This situation is shown in FIG. 7. Unlike the TLB 60 of FIG. 5, in the TLB 80 of FIG. 7, the physical memory page address PP_X is only associated with one memory translation entry (row) 82. The CTX_MTE value in row 82 includes an equivalency bit 84 set to one, and four m bits 86 set to a digital two (0010) value indicating that the second equivalency class is specified.

If an equivalency class does not exist, then the equivalency bit is set to zero and an n bit long identification word is used in the CTX_MTE word. This latter situation is equivalent to a prior art memory translation operation.

In accordance with the invention, a successful memory translation operation from a virtual page address to a physical page address for a memory item belonging to an equivalency class transpires when the context value from the CPU (CTX_CPU) corresponds to the context value for a memory translation entry (CTX_MTE) and the virtual page address from the CPU (VA_CPU) is equivalent to the virtual page address in the memory translation entry (VA_MTE). Note that the data format for CTX_CPU and CTX_MTE is of the form shown in FIG. 6. That is, this entry is executed by processing equivalency class information, as will be further described below. A successful memory translation operation can be summarized as a boolean statement.

$$(f(CTX\_CPU, CTX\_MTE)=1) AND (VA\_CPU=VA\_MTE) \quad \text{(Equation 2)}$$

The function f(CTX_CPU, CTX_MTE) can be implemented as follows:

```
(1)    if (CTX_MTE.EC=1){
(2)        return(CTX_CPU.mask & CTX_MTE.mask)
(3)    } else {
(4)        return(CTX_MTE.id = CTX_CPU.id)
```

Line (1) checks the equivalency bit (EC) of CTX_MTE. If the bit is set to one, then an operation is performed to determine whether the mask value portion of the word from the CPU (CTX_CPU.mask) corresponds to the mask value portion of the word of the memory entry (CTX_MTE.mask). These values do not have to be equivalent. If a logical AND operation, specified by the "&" in line (2), returns a non-zero value, then a boolean value of "true" is returned, indicating there is a mask match. For example, in a binary system, if the passed CTX_CPU.mask value is "0110" and the CTX_MTE.mask value is "0010", then the operation at line (2) returns a value of "0010". This is a non-zero value, indicating a boolean value of true. On the other hand, if the passed CTX_CPU.mask value is "1001" and the CTX_MTE.mask value is "0110", then the operation at line (2) returns a value of "0000". This is a zero value, indicating a boolean value of false. A true boolean value indicates that a match has been found, while a false boolean value indicates that a match has not been found.

Note that identity between the mask value from the CPU (CTX_CPU.mask) and the mask value from the memory entry (CTX_MTE.mask) is not required. Recall that there can be many context values for a given equivalency class. The CTX_MTE.mask term maps all of the classes. If any value passed from the CPU (CTX_CPU.mask) produces a true boolean value, then a match to the equivalency class exists.

The remaining lines of code handle the situation wherein an equivalency class does not exist. In this case, processing is consistent with prior art techniques that always assume there is no equivalency class. The statement at line (4) states that a boolean true value is returned if the identification bits from the CPU (CTX_CPU.id) are equivalent to the identification bits of the memory translation entry (CTX_MTE.id). Recall from FIG. 6 that this value is an n bit quantity.

The example of FIG. 4 shows a set of three processes mapping to a single physical page address. A single equivalency class may be used to characterize this situation. That is, a single equivalency class maps a single page. Since the CTX_CPU.mask can specify a fixed number of equivalency classes, the invention can be extended such that an equivalency class maps a collection of physical page addresses. For example, one equivalency class may designate library files as follows <libc mapped at VA_1, libnsl mapped at VA_2, libfoo mapped at VA_3>.

It should also be appreciated that the CTX_MTE.mask can identify more than one equivalency class. For example, if a second equivalency class designates the files <libc mapped at VA_1, libX mapped at VA_4>, then the CTX_MTE for pages belonging to libc will indicate both equivalency classes by having two bits set in CTX_MTE.mask.

Figure 8:
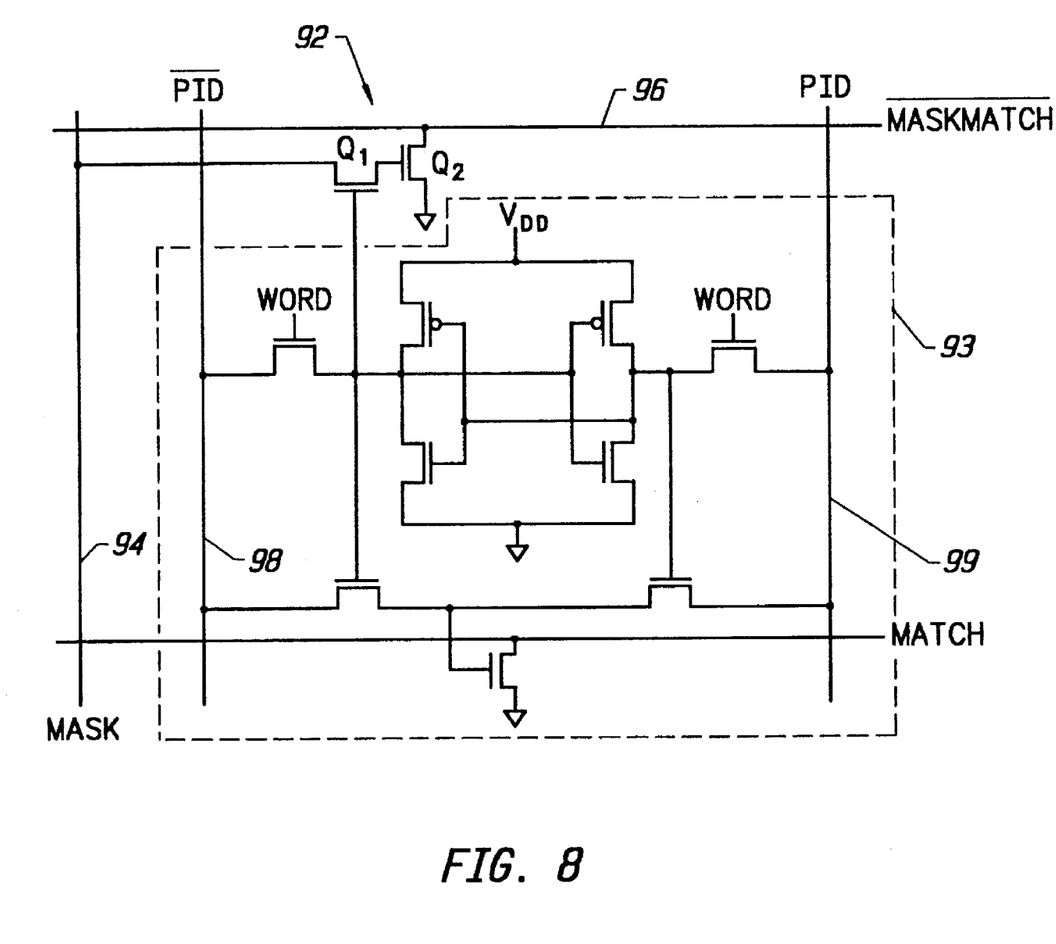
FIG. 8 illustrates a circuit that may be used to compare individual bits in a translation-lookaside buffer.
Figure 9:
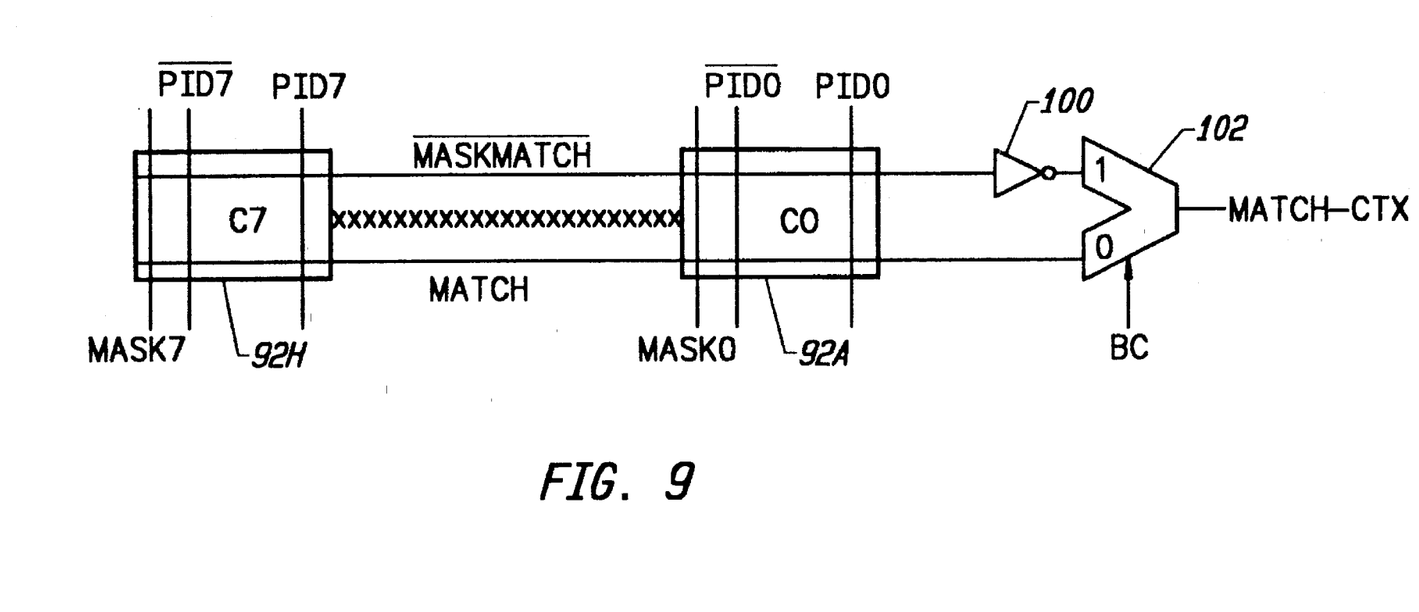
FIG. 9 illustrates the circuit of FIG. 8 linked with similar circuits to provide a circuit to compare words in a translation-lookaside buffer.

FIG. 7 generally illustrates comparison hardware 90 that may be used to compare the values from the CPU (CTX_CPU, VA_CPU) to the values in the TLB 80. The comparison operation is done in parallel. FIG. 8 illustrates one cell 92 that may be used for comparing one bit of information from the CTX_MTE word. FIG. 9 illustrates a set of cells 92A-92H linked to form a circuit to compare an 8-bit CTX_MTE word and a 16-bit CTX_CPU word.

FIG. 8 includes a standard region 93 that is identical to cells commonly used in TLBs. The "word" inputs of the standard region 93 are used to load and store an m or n bit from the CTX_MTE word, while the PID line is used to load an identification tag CTX_CPU bit and the PID (inverse) line loads the inverse of the PID bit.

The standard region 93 is supplemented to include a MASK line 94, a MASKMATCH(inverse) line 96, a Q1 transistor, and a Q2 transistor. The mask line 94 loads a mask tag CTX_CPU bit. The transistors Q1 and Q2 perform a logical NAND operation between the stored CTX_MTE bit and the MASK bit on line 94. If a match is found, then MASKMATCH(inverse) carries a low signal. If a match is not found, then MASKMATCH(inverse) carries a high signal. The signal is then inverted by inverter 100, as shown in FIG. 9, thereby effectively executing a logical AND operation.

The mode circuit 102 shown in FIG. 9 reads the equivalency class bit. If the equivalency class bit is high, the MASKMATCH(inverse) line is selected, otherwise the MATCH line is selected and the circuit operates in a traditional manner to compare the CTX_CPU identification tag with the CTX_MTE identification tag. Those skilled in the art will recognize numerous hardware configurations that may be successfully employed to execute the comparison operations required in accordance with the invention.

The foregoing scenario wherein all TLB entries are compared simultaneously defines a fully-associative TLB. In such a configuration, any line in the TLB may be used to insert a new TLB value.

If the invention is implemented in conjunction with a set-associative TLB, then insertion into the TLB may be accomplished using the following technique:

| | |
|---|---|
| (1) | If CTX_PTE.EC = 0 then use h(id,VA_MTE) |
| (2) | else use h(0,VA_MTE) |

This pseudo-code states that if the equivalency bit is set to zero, then a hash function is performed on the identification bits and the virtual address "h(id,VA)".

As is known in the art, in a hash function, the key X is treated as a number and the arithmetic function $f^H$, called the hash function, is used to compute the physical address $f^H(X)$. Many hash functions may be used. One hash function is to divide X by a constant n and use the remainder as the address, i.e., $f^H(X, Y) = \text{remainder}(X \text{ xor } Y) \text{ modulo } n$.

Thus, one way of implementing the invention in a set-associate TLB is to execute a hash function on the numeric value defined by the n bits of CTX_MTE.id, as shown in FIG. 6, and the virtual address VA_MTE.

Line (2) of the foregoing code indicates that a hash function is executed only on the virtual address when no equivalency class has been defined.

Looking up a value in a set-associative TLB may be accomplished by choosing a TLB set using h(id,VA). This operation is identical to line (1) of the pseudo-code above. If this hash operation fails, then a hash function h(0,VA) is used. This operation is identical to line (2) of the pseudo-code above. This sequence of operations may be reversed.

An alternative embodiment for set-associative TLBs uses a multiple probe approach. In this technique, depending on the bits which are set in CTX_CPU, a set of constants are selected: Co ... Cj (e.g., if any of the high-order n/2 bits in CTX_CPU are set, then choose Co, else choose Cj). A lookup is then performed using h(id,VA), then using h'(Co, VA), then h'(Cj,VA), etc. Note that the hash functions h() and h'() could be different functions.

Figure 10:
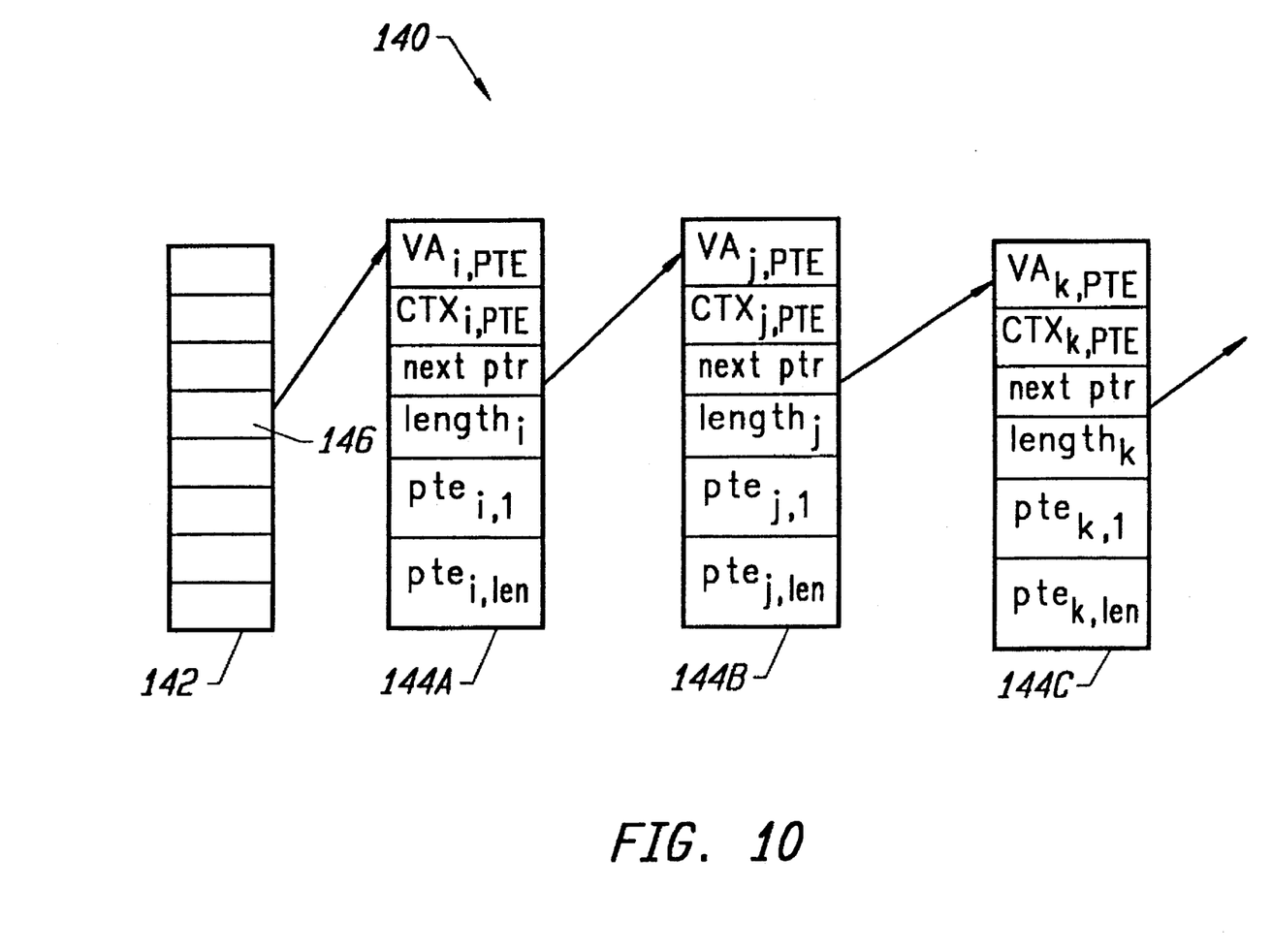
FIG. 10 illustrates page tables that may be used in accordance with one embodiment of the invention.

The memory translation technique of the invention has been described in relation to TLBs. The technique is equally applicable to page tables. Page tables are described above in the background section, particularly in reference to FIGS. 2 and 3. The page table configurations shown in FIGS. 2 and 3 may be implemented as a set of descriptors with pointers between the different descriptors. This implementation is shown in FIG. 10. The page table 140 includes a hash bucket array 142 that points to a set of descriptors 144A-144C. In other words, a hash function is performed and generates a hash address (bucket) 146. The hash address 146 points to a descriptor 144A. Descriptor 144A points to descriptor 144B and descriptor 144B points to descriptor 144C. Page tables of this form are known in the art. A particularly useful page table configuration that supports multiple page sizes is described in the U.S. patent application entitled "Virtual Memory Computer System Address Translation Mechanism that Supports Multiple Page Sizes", filed Oct. 20, 1993, Ser. No. 08/139,549. The application is assigned to the assignee of the present invention and is expressly incorporated by reference herein.

Each descriptor 144 of FIG. 10 includes a starting virtual address of a block of virtual memory (VA_i,PTE), a CTX_PTE that designates the address space where the mapping resides, a pointer (next ptr) to the next descriptor, a length (length_i) for the descriptor, and an array of page table entries (pte_i,1 ... pte_i, len).

As previously indicated, a page table is typically searched after a TLB miss. The searching operation is analogous to that described in relation to a TLB. When a translation from a virtual address is required, the CPU presents control software with a VA_CPU word and a word describing the current CPU context (CTX_CPU). A hash function (h(CTX_CPU,VA_CPU)) is then used on these values to select a hash value, such as hash bucket 146 of FIG. 10. The hash bucket 146 points to a descriptor 144. Each descriptor is searched to satisfy Equation 1, as defined above.

This search may rely upon the following function which determines whether a particular descriptor has a page table entry which corresponds to the virtual page address from the CPU:

| | |
|---|---|
| (1) | equal(VA_CPU,desc) |
| (2) | if((desc.VA_PTE <= VA_CPU) AND |
| (3) | (VA_CPU < desc.VA_PTE + length)) return 1 |
| (4) | else return 0 |

This function finds the descriptor that has the page table entry of interest. As indicated above, each descriptor has a base address VA_PTE and length. If the VA_CPU value is within the range (desc.VA_PTE, desc.VA_PTE+length) specified by the descriptor, then the descriptor has the page table entry to match the VA_CPU value.

Line (1) of the code specifies that the virtual page address from the CPU (VA_CPU) and descriptor (desc) of interest are passed to the function. The "if" clause of line (2) checks to determine if the virtual page address from the CPU (VA_CPU) is greater than the base physical page address for the descriptor (desc.VA_PTE). Line (3) checks to determine if the virtual page address from the CPU (VA_CPU) is less than the largest address for the descriptor (desc.VA_PTE+length). Recall that the term length specifies the length of the descriptor, as shown in FIG. 10. If the address from the CPU (VA_CPU) is within the specified range, then the equal function is true (1), otherwise it is false (0).

To return an actual physical page number from a descriptor, the following function may be used:

(1) valid (VA_CPU,desc)
(2) i=(VA_CPU—desc.VA_PTE)/PAGESIZE
(3) use i to index into PTE descriptor (PTE[i])
(4) if(PTE[i] is valid) return 1
(5) else return 0

In line (1) the valid function is defined and the virtual page address from the CPU and the subject descriptor are passed to the function. An index value is then defined by subtracting the virtual page address number received from the CPU (VA_CPU) from the virtual page address number of the page table (desc.VA_PTE) and then dividing this difference by the page size. For example, if the virtual page address number from the CPU (VA_CPU) is 8934, the virtual page address number for the page table (desc.VA_PTE) selected by the equal function is 8000, and the page size is 100, then i=(8934−8000)/100=9 (the fractional term 0.34 is truncated). As described at line (3), the i term is then used to index into the PTE array. Relying upon the previous example, it can be appreciated that the i term indexes into the tenth entry of the PTE array. Line (4) tests to determine whether the valid bit is set at this position. If so, a true value (1) is returned, otherwise, a false value (0) is returned.

The foregoing operations executed in relation to page tables may utilize the CTX_CPU and CTX_MTE values defined in accordance with the invention (and shown in FIG. 6). For example, the CTXi_PTE term of each descriptor 144 of FIG. 10 is substituted with the CTX_MTE term disclosed in FIG. 6. That is, the CTXi_MTE term includes an equivalency class bit and m mask bits or n identification bits. Similarly, each page table 140 is passed a CTX_CPU value that includes m mask bits or n identification bits.

To identify a page table match, each descriptor is tested against the following boolean logic:

| | |
|---|---|
| (1) | (f(CTX_CPU,CTX_MTE)=1) AND |
| (2) | equal(VA_CPU,desc) AND |
| (3) | valid (VA_CPU,desc) |

The operation of each of these expressions is described above. The CTX_CPU and CTX_MTE terms are described in relation to FIG. 6. The search strategies are executed in software. The search strategies may be executed for a fully associative or set associative page table. The search strategies discussed in relation to the TLB implementation are equally applicable to the page table implementation.

Figure 11:
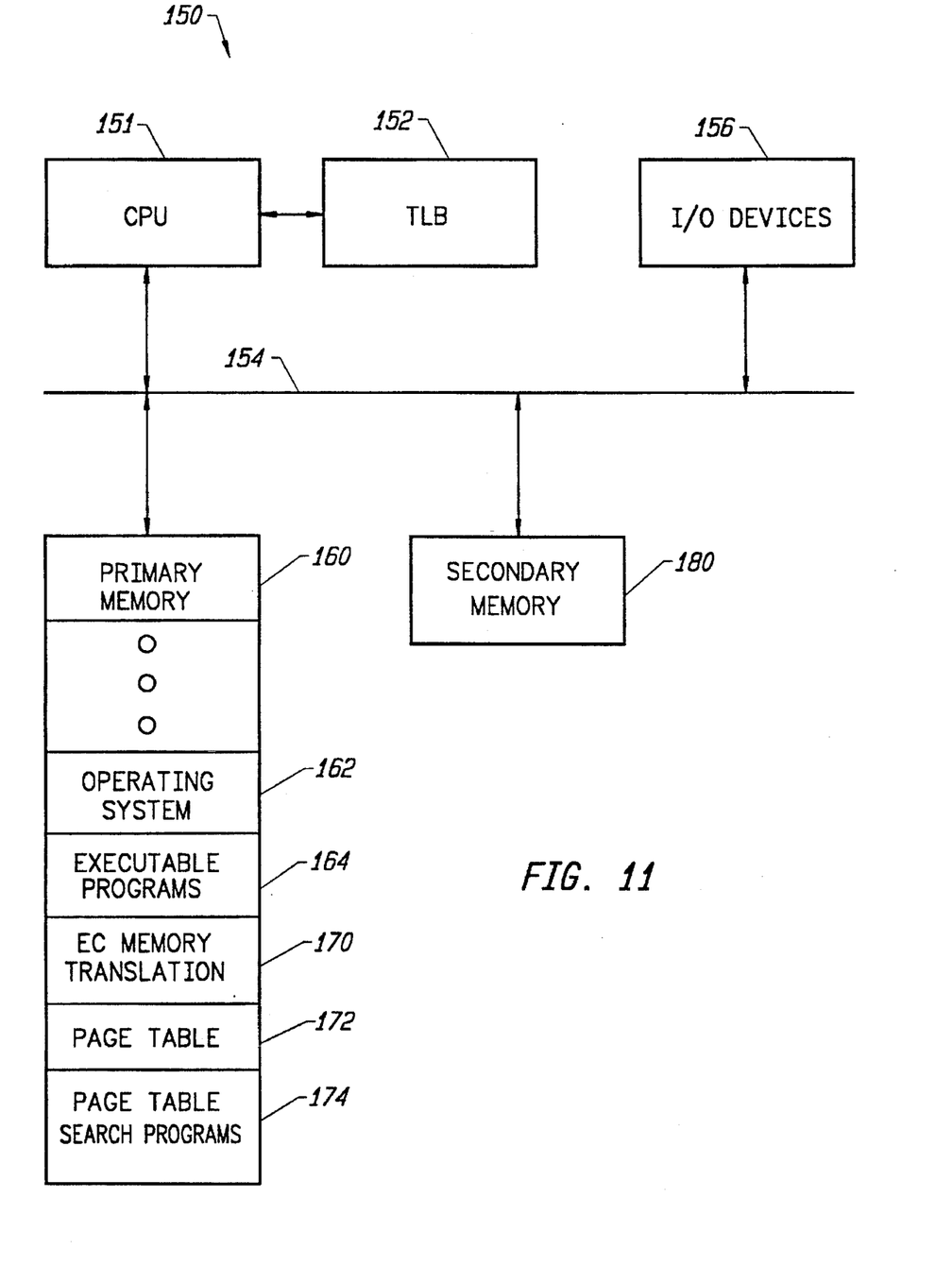
FIG. 11 illustrates a general computer configured in accordance with one embodiment of the present invention.

FIG. 11 generally illustrates the present invention incorporated into a general purpose computer 150. The computer 150 includes a CPU 151 that communicates with a TLB 152. The TLB 152 is preferably implemented in a manner consistent with the TLB described in relation to FIGS. 8 and 9. The CPU 151 is also connected to a system bus 154 that interfaces with a set of input/output devices 156. The CPU 151 also communicates with primary memory 160. Primary memory 160 stores an operating system 162, such as the UNIX™ operating system. Primary memory 160 also stores executable programs 164 that utilize a virtual address memory scheme.

Primary memory 160 also stores an equivalency class memory translation definition 170 as described in FIG. 6. Standard techniques are used so that the operating system 162 forces the CPU 151 to use CTX_CPU definitions in accordance with the invention. Note also that the operating system 162 is modified to recognize different virtual addresses that map to a single physical address. That is, the operating system 162 can be readily modified to include an address identification routine. For example, the address identification routine can scan the TLB 60 of FIG. 5 and identify that three virtual page addresses map to the same physical page address. A mask assignment routine can then be added to the operating system 162 such that the three virtual page addresses are assigned a mask value. In addition, a write routine can be incorporated into the operating system 162 such that the three virtual page addresses are written as a single address, as shown in FIG. 7.

The primary memory 160 also stores page tables 172, for instance of the type described in relation to FIG. 10. Finally, the primary memory 160 stores page table search programs 174 that implement page table search strategies consistent with the disclosure of the invention.

The foregoing descriptions of specific embodiments of the present invention are presented for purposes of illustration and description. They are not intended to be exhaustive or to limit the invention to the precise forms disclosed, obviously many modifications and variations are possible in view of the above teachings. A number of embodiments will be described for the purpose of illustration.

The techniques of the invention can be applied to inverted and hashed page tables. It will also be appreciated by those skilled in the art that the techniques of the invention can be applied to any hash table lookup which maps multiple related keys to a single value. Thus, the invention need not be restricted to virtual addresses and physical addresses. It should be appreciated that this disclosure only discusses translation operations between virtual addresses and physical addresses. Operations associated with a page table or TLB also include the processing of attributes, protection checking, and related functions. These operations are performed in accordance with prior art techniques. Finally, it will be appreciated by those skilled in the art that the invention may be implemented in a variety of ways. For example, the mask scheme of the invention may be applied to both TLBs and page tables. In such a scheme, the TLBs and page tables will include mask scheme entries in accordance with the invention and standard entries in accordance with the prior art. The invention may also be implemented by using a TLB with mask entries and standard entries and a page table only using standard entries. In the alternative, the invention may be implemented using page tables with mask entries and standard entries and a TLB only using standard entries.

The disclosed embodiments were selected in order to explain the principles of the invention and its practical applications, to thereby enable others skilled in the art to utilize the invention and various embodiments with various modifications as are suited to the particular use contemplated. It is intended that the scope of the invention be defined by the following claims and their equivalents.

We claim:

1. A method of sharing virtual memory translations, said method comprising the steps of:

identifying a plurality of distinct virtual memory translation entries, associated with a plurality of distinct processes running on a computer, that map to a common physical memory page address;

defining said plurality of distinct virtual memory translation entries as an equivalency class;

assigning a first mask value to said plurality of distinct virtual memory translation entries;

storing said plurality of distinct virtual memory translation entries as a single address associated with said first mask value; and comparing a second mask value of a translation-request virtual memory translation value to said first mask value to determine whether said second mask value corresponds to said first mask value and thereby determine whether said translation-request virtual memory translation value maps to said common physical memory page address.

2. The method of claim 1 wherein said identifying step includes the step of identifying a plurality of distinct virtual memory translation entries, associated with a plurality of distinct processes running on a computer, that map to a common set of physical memory page addresses.

3. The method of claim 1 further comprising the step of identifying said equivalency class with an equivalency class bit.

4. The method of claim 3 further comprising the step of combining said equivalency class bit with said first mask value to form a context memory translation entry word.

5. The method of claim 1 wherein said storing step includes the step of storing said single address and said first mask value in a translation-lookaside buffer.

6. The method of claim 1 wherein said comparing step is performed with a translation-lookaside buffer.

7. The method of claim 1 wherein said storing step includes the step of storing said single address and said first mask value in a page table.

8. The method of claim 1 wherein said comparing step is performed with a page table search program.

9. A computer that shares virtual memory translations, said computer comprising:

a central processing unit;

an operating system executing in conjunction with said central processing unit, said operating system being programmed to include an address identification routine to identify a plurality of distinct virtual memory translation entries, associated with a plurality of distinct processes running on said computer, that map to one or more common physical memory page addresses, said address identification routine defining said plurality of distinct virtual memory translation entries as an equivalency class, a mask assignment routine to assign a first mask value to said plurality of distinct virtual memory translation entries, and a write routine to write said plurality of distinct virtual memory translation entries as a single address associated with said first mask value; and a comparison mechanism, operating in conjunction with said central processing unit and said operating system, to compare a second mask value of a translation-request virtual memory translation value to said first mask value to determine whether said second mask value corresponds to said first mask value and thereby determine whether said translation-request virtual memory translation value corresponds to said common physical memory page address.

10. The computer of claim 9 wherein said operating system is programmed to identify said equivalency class with an equivalency class bit.

11. The computer of claim 10 wherein said operating system is programmed to combine said equivalency class bit with said first mask value to form a context memory translation entry word.

12. The computer of claim 10 wherein said operating system is programmed to combine said equivalency class bit with said first mask value to form a context memory translation entry word corresponding to a plurality of equivalency classes.

13. The computer of claim 11 wherein said single address and said first mask value are written to a translation-lookaside buffer.

14. The computer of claim 13 wherein said translation-lookaside buffer is a fully associative translation-lookaside buffer.

15. The computer of claim 13 wherein said translation-lookaside buffer is a set-associative translation-lookaside buffer.

16. The computer of claim 13 wherein said translation-lookaside buffer also stores a context identification value, a virtual address value, and a physical page value in addition to said single address and said first mask value.

17. The computer of claim 11 wherein said comparison mechanism is a translation-lookaside buffer.

18. The computer of claim 11 wherein said single address and said first mask value are written to a page table.

19. The computer of claim 11 wherein said comparison mechanism is a page table search program.

* * * * *